(12) United States Patent
Liang

(10) Patent No.: US 12,033,241 B2
(45) Date of Patent: Jul. 9, 2024

(54) SCENE INTERACTION METHOD AND APPARATUS, ELECTRONIC DEVICE, AND COMPUTER STORAGE MEDIUM

(71) Applicant: TENCENT TECHNOLOGY (SHENZHEN) COMPANY LIMITED, Guangdong (CN)

(72) Inventor: Yuxuan Liang, Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

(21) Appl. No.: 17/666,081

(22) Filed: Feb. 7, 2022

(65) Prior Publication Data

US 2022/0156986 A1 May 19, 2022

Related U.S. Application Data

(63) Continuation of application No. PCT/CN2020/127750, filed on Nov. 10, 2020.

(30) Foreign Application Priority Data

Jan. 16, 2020 (CN) .......................... 202010049112.1

(51) Int. Cl.
*G06T 11/00* (2006.01)
*G06V 10/44* (2022.01)
(Continued)

(52) U.S. Cl.
CPC .............. *G06T 11/00* (2013.01); *G06V 10/44* (2022.01); *G06V 20/20* (2022.01); *G06V 20/41* (2022.01);
(Continued)

(58) Field of Classification Search
CPC ...... G06V 10/16; G06V 40/172; G06V 10/40; G06T 2219/024; G06T 17/00;
(Continued)

(56) References Cited

U.S. PATENT DOCUMENTS

| | | | |
|---|---|---|---|
| 9,292,085 B2 | 3/2016 | Bennett et al. | |
| 10,356,393 B1 * | 7/2019 | Binns ................... | H04N 13/117 |

(Continued)

FOREIGN PATENT DOCUMENTS

| | | | | |
|---|---|---|---|---|
| CN | 103617432 A | * | 3/2014 | ............... G06K 9/66 |
| CN | 103810353 A | * | 5/2014 | ............. G06T 11/00 |

(Continued)

OTHER PUBLICATIONS

Chinese Office Action for 202010049112.1, issued Dec. 28, 2022, 15 pages, with Concise English translation.

(Continued)

*Primary Examiner* — Ryan R Yang
(74) *Attorney, Agent, or Firm* — ArentFox Schiff LLP

(57) ABSTRACT

A method for scene interaction includes identifying a first real scene interacting with a virtual scene and obtaining media information of the first real scene. The method also includes determining a scene feature associated with the first real scene based on a feature extraction on the media information, and mapping the scene feature associated with the first real scene to the virtual scene according to a correspondence between the virtual scene and the first real scene. Apparatus and non-transitory computer-readable storage medium counterpart embodiments are also contemplated.

19 Claims, 9 Drawing Sheets

(51) Int. Cl.
*G06V 20/20* (2022.01)
*G06V 20/40* (2022.01)
*G06V 40/16* (2022.01)
*G06V 40/20* (2022.01)
*G10L 15/08* (2006.01)
*H04L 67/02* (2022.01)
*H04L 69/16* (2022.01)

(52) U.S. Cl.
CPC ............ *G06V 20/46* (2022.01); *G06V 40/16* (2022.01); *G06V 40/20* (2022.01); *G06T 2210/61* (2013.01); *G10L 15/08* (2013.01); *H04L 67/02* (2013.01); *H04L 69/16* (2013.01)

(58) Field of Classification Search
CPC ......... G06T 13/40; G10L 15/26; G10L 25/57; G10L 25/15; G06F 3/011
See application file for complete search history.

(56) References Cited

U.S. PATENT DOCUMENTS

| | | | | |
|---|---|---|---|---|
| 11,232,601 | B1 * | 1/2022 | Meisenholder | .... G02B 27/0172 |
| 2010/0211397 | A1 | 8/2010 | Park et al. | |
| 2019/0083888 | A1 | 3/2019 | Ziaja et al. | |
| 2019/0129607 | A1 * | 5/2019 | Saurabh | .................. G06F 3/011 |

FOREIGN PATENT DOCUMENTS

| | | | | | |
|---|---|---|---|---|---|
| CN | 104536579 | A | | 4/2015 | |
| CN | 105912474 | A | | 8/2016 | |
| CN | 106201877 | A | | 12/2016 | |
| CN | 106355153 | A | * | 1/2017 | ........... G06T 19/006 |
| CN | 106485782 | A | * | 3/2017 | ............. G06T 17/00 |
| CN | 106492461 | A | | 3/2017 | |
| CN | 107129420 | A | | 9/2017 | |
| CN | 108985176 | A | * | 6/2018 | ........... G06V 40/168 |
| CN | 108269307 | A | | 7/2018 | |
| CN | 110084228 | A | * | 8/2018 | ............... G06N 3/08 |
| CN | 108881784 | A | | 11/2018 | |
| CN | 109903129 | A | | 6/2019 | |
| CN | 110113298 | A | * | 8/2019 | ............. H04L 69/22 |
| CN | 105608746 | B | * | 10/2019 | .......... G06T 19/006 |
| CN | 110365666 | A | * | 10/2019 | .......... G06T 19/006 |
| CN | 110523080 | A | | 12/2019 | |
| CN | 110538459 | A | | 12/2019 | |
| CN | 110585712 | A | | 12/2019 | |
| CN | 110585731 | A | | 12/2019 | |
| CN | 111265873 | A | | 6/2020 | |
| CN | 111274910 | A | | 6/2020 | |
| JP | 2002169901 | A | | 6/2002 | |
| JP | 2007266713 | A | | 10/2007 | |
| JP | 2015126524 | A | | 7/2015 | |
| JP | 2019049601 | A | | 3/2019 | |
| JP | 2019185185 | A | | 10/2019 | |
| WO | WO-2013114837 | A1 | * | 8/2013 | ............. G09B 19/04 |
| WO | 2017155126 | A1 | | 9/2017 | |

OTHER PUBLICATIONS

Mourad Boufarguine et al: "Virtu4D: a Real-time Virtualization of Reality", May 1, 2010, pp. 1-9.
International Search Report dated Jan. 27, 2021 issued in corresponding application PCT/CN2020/123672 (with English translation).
First Office Action dated Dec. 23, 2020 issued in corresponding Chinese patent application No. 202010048869.9 (with English translation).
Second Office Action dated Apr. 20, 2021 issued in corresponding Chinese patent application No. 202010048869.9 (with English translation).
Japanese Office Action for 2022-521702, issued Jul. 3, 2023, with English translation, 11 pages.
International Search Report and Written Opinion for PCT/CN2020/127750, issued Feb. 22, 2021, 12 pages, English translation included.

* cited by examiner

SCENE INTERACTION METHOD AND APPARATUS, ELECTRONIC DEVICE, AND COMPUTER STORAGE MEDIUM

RELATED APPLICATIONS

This application is a continuation of International Application No. PCT/CN2020/127750, entitled "SCENE INTERACTION METHOD AND APPARATUS, ELECTRONIC DEVICE, AND COMPUTER STORAGE MEDIUM" and filed on Nov. 10, 2020, which claims priority to Chinese Patent Application No. 202010049112.1, filed on Jan. 16, 2020. The entire disclosures of the prior applications are hereby incorporated by reference in their entirety.

FIELD OF THE TECHNOLOGY

This disclosure relates to the field of artificial intelligence technologies including a scene interaction method and apparatus, an electronic device, and a computer storage medium.

BACKGROUND OF THE DISCLOSURE

With the development of Internet and information technologies, more and more enterprises may organize and launch various online and offline marketing activities with the help of a network communication technology. A user at an activity site may directly participate in an offline activity, while a user who is not at the activity site may participate in an online activity with the help of a network communication device such as a mobile phone or a computer.

However, in a related manner of organizing an activity, online and offline activities are separate from each other. Consequently, usually, it is difficult to perform a direct interaction or only a simple interaction in a limited form can be performed. Therefore, how to improve interaction efficiency and interaction quality of the activity scene is an urgent problem to be resolved currently.

SUMMARY

In view of this, embodiments of this disclosure provide a scene interaction method and apparatus, an electronic device, and a non-transitory computer storage medium, to not only improve interaction efficiency, but also achieve a wider variety of interaction effects.

Some aspects of the disclosure provide a method for scene interaction. The method includes identifying a first real scene interacting with a virtual scene and obtaining media information of the first real scene. The method also includes determining a scene feature associated with the first real scene based on a feature extraction on the media information, and mapping the scene feature associated with the first real scene to the virtual scene according to a correspondence between the virtual scene and the first real scene.

Some aspects of the disclosure provide an apparatus including processing circuitry. The processing circuitry identifies a first real scene interacting with a virtual scene, and obtains media information of the first real scene. The processing circuitry determines a scene feature associated with the first real scene based on a feature extraction on the media information; and maps the scene feature associated with the first real scene to the virtual scene according to a correspondence between the virtual scene and the first real scene.

Some aspects of the disclosure also provide a non-transitory computer-readable medium storing instructions which when executed by a computer cause the computer to perform the method for scene interaction.

The embodiments of this disclosure provide a computer-readable storage medium. The computer-readable storage medium stores a computer program, and when being executed by a processor, the computer program implements the scene interaction method according to the foregoing technical solutions.

The embodiments of this disclosure provide an electronic device. The electronic device includes: a processor; and a memory, configured to store executable instructions of the processor; where the processor is configured to execute the executable instructions to perform the scene interaction method according to the foregoing technical solutions.

In the technical solutions provided in the embodiments of this disclosure, a scene feature of a real scene is obtained by performing a feature extraction on real scene information, and the scene feature of the real scene is mapped to a virtual scene, thereby implementing a real-time integration and interaction of an offline character and scene with an online virtual scene, which not only improves interaction efficiency, but also achieves a wider variety of interaction effects.

BRIEF DESCRIPTION OF THE DRAWINGS

The accompanying drawings herein are incorporated in and constitute a part of the specification, illustrate embodiments of this disclosure, and are used to explain the principle of the embodiments of this disclosure together with the specification. The accompanying drawings described below are some embodiments of this disclosure. In the accompanying drawings.

DESCRIPTION OF EMBODIMENTS

Figure 1:
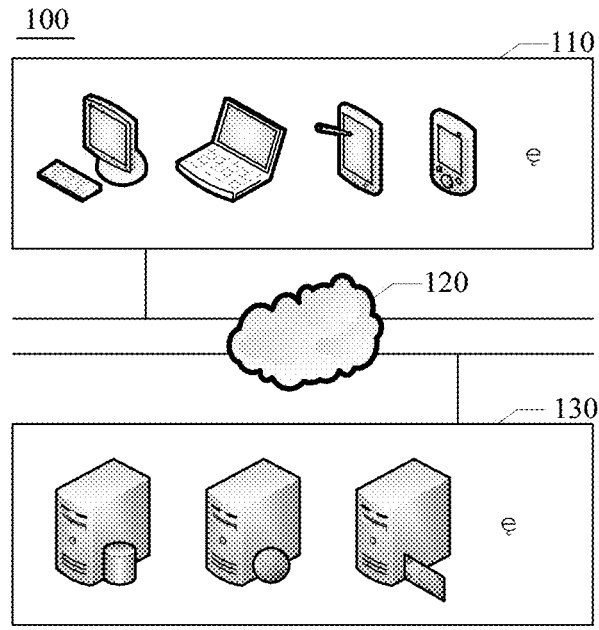
FIG. 1 shows a schematic diagram of an exemplary system architecture to which a technical solution according to embodiments of this disclosure is applied.

Exemplary implementations are now described more comprehensively with reference to the accompanying drawings. However, the exemplary implementations can be implemented in various forms and are not construed as being limited to the examples herein. Conversely, such implementations are provided to make this disclosure more comprehensive and complete, and fully convey the concepts of the exemplary implementations to a person skilled in the art.

In addition, the described characteristics, structures, or features may be combined in one or more embodiments in any appropriate manner. In the following descriptions, a lot of specific details are provided to give a full understanding of the embodiments of this disclosure. However, a person skilled in the art is to be aware of that, the technical solutions in the embodiments of this disclosure may be implemented without one or more of the particular details, or other methods, unit, apparatus, or step may be adopted. In other cases, well-known methods, apparatuses, implementations, or operations are not shown or described in detail, to avoid obscuring the aspects the embodiments of this disclosure.

The block diagrams shown in the accompanying drawing are merely functional entities and do not necessarily correspond to physically independent entities. To be specific, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

In the related art of this disclosure, simple online or offline activities cannot satisfy current diverse lifestyles and a new youth user group becoming more and more curious and interesting.

Therefore, based on the problems in the related art, the embodiments of this disclosure, based on an artificial intelligence technology such as a computer vision technology, a computer speech technology, and machine learning, provides a scene interaction method and apparatus, an electronic device, and a computer storage medium, and relates to the field of artificial intelligence technologies. The scene interaction method may be applicable to the field of artificial intelligence, which uses the artificial intelligence technology to implement real-time integration and interaction between an offline character and scene and an online virtual scene.

The following describes the artificial intelligence technology. The artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. The AI technology is a comprehensive discipline and relates to a wide range of fields including both hardware-level technologies and software-level technologies. The embodiments of this disclosure relate to computer vision (CV) technologies and speech processing technologies of artificial intelligence (AI).

Computer vision (CV) is a science that studies how to enable a machine to "see", and to be specific, to implement machine vision such as recognition, tracking, measurement, and the like for a target by using a camera and a computer in replacement of human eyes, and further perform graphic processing, so that the computer processes the target into an image more suitable for human eyes to observe, or more suitable to be transmitted to an instrument for detection. As a scientific discipline, CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition. Key technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

FIG. 1 schematically shows a schematic diagram of an exemplary system architecture to which a technical solution according to embodiments of this disclosure is applied.

As shown in FIG. 1, a system architecture 100 may include a client 110, a network 120, and a server 130. The client 110 may include various terminal devices such as a smartphone, a tablet computer, a notebook computer, and a desktop computer. The server 130 may include various server devices such as a network server, an application server, and a database server. The network 120 may be a communication medium of various connection types capable of providing a communication link between the client 110 and the server 130, for example, a wired communication link or a wireless communication link.

The system architecture of the embodiments of this disclosure may include any quantity of clients, any quantity of networks, and any quantity of servers according to an implementation requirement. For example, the server 130 may be a server group including a plurality of server devices, and the client 110 may be a terminal device cluster including a plurality of terminal devices distributed in a same offline activity scene or a plurality of different offline activity scenes. In addition, the scene interaction method of the embodiments of this disclosure may be applied to the client 110, may be applied to the server 130, or may be further performed by the client 110 and the server 130 together, which is not particularly limited in the embodiments of this disclosure.

With reference to FIG. 1, the application scenes of the scene interaction method of the embodiments of this disclosure are described:

An enterprise marketing activity is used as an example for description. When an enterprise organizes online and offline marketing activities synchronously, an application used for synchronizing marketing activities may be adopted. The application may include a merchant version and a user version. The enterprise can initiate the activity by running and logging in to the merchant version client of the application on a terminal. An online user can achieve an online synchronization by running and logging in to the user version client of the application on the terminal. In the embodiments of this disclosure, the server 130 is a server corresponding to the application, and the client 110 includes a merchant client and an online user client. The merchant forms a virtual scene by using the client 110, each user uploads data corresponding to a real scene of a current environment in which the user is located by using the client 110, and the client 110 transmits the data corresponding to the real scene to the server 130 by using the network 120, so that the server 130 can obtain real scene information of the real scene in real time, perform a feature extraction on each real scene information, to correspondingly obtain a scene feature of each real scene, and finally map the scene feature of the at least one real scene to the virtual scene according to a correspondence between the virtual scene and the real scene, thereby implementing a real-time integration and interaction of an offline character and scene with an online virtual scene, which not only improves interaction efficiency, but also achieves a wider variety of interaction effects.

A scene interaction method and apparatus, an electronic device, and a computer storage medium provided by the embodiments of this disclosure are described in detail below with reference to specific implementations.

Figure 2:
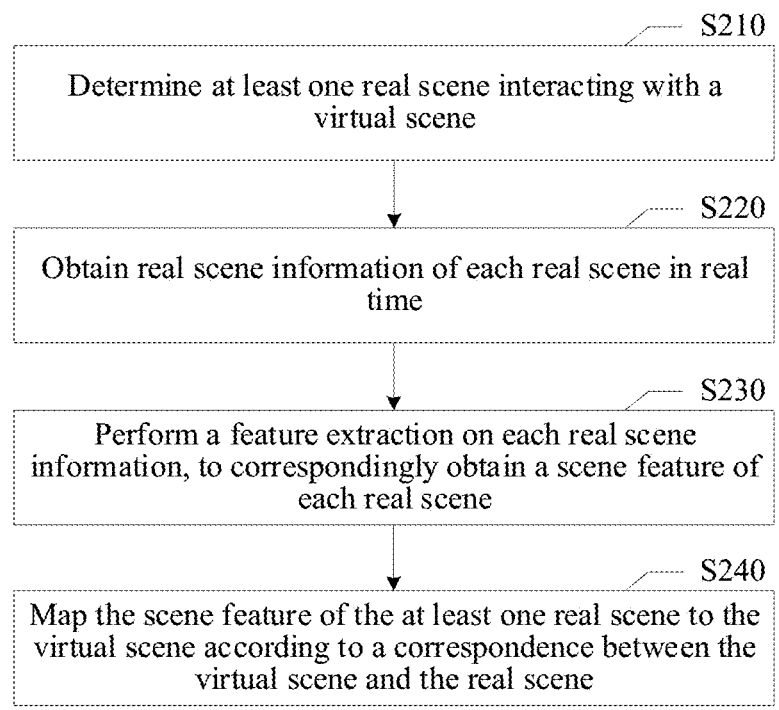
FIG. 2 shows a flowchart of steps of a scene interaction method according to some embodiments of this disclosure.

FIG. 2 schematically shows a flowchart of steps of a scene interaction method according to some embodiments of this disclosure. The method may be applied to a client displaying the virtual scene, for example, a terminal device such as a mobile phone or a computer displaying the online activity scene in an online live manner. In addition, the method may also be applied to a server integrating content of online and offline activity scenes, for example, a server device that provides live content and a technical support for an online live platform. As shown in FIG. 2, the method may mainly include the following steps:

In step S210, at least one real scene interacting with a virtual scene is determined.

The virtual scene may be an online activity scene displayed to a user by using a terminal device with a display interface such as a mobile phone or a computer, and interacting with an online user by using network communication, while the real scene is an offline activity scene interacting with the corresponding online activity scene. In some implementations, one virtual scene alone may interact with one real scene, or may interact with two or more real scenes simultaneously.

Figure 3:
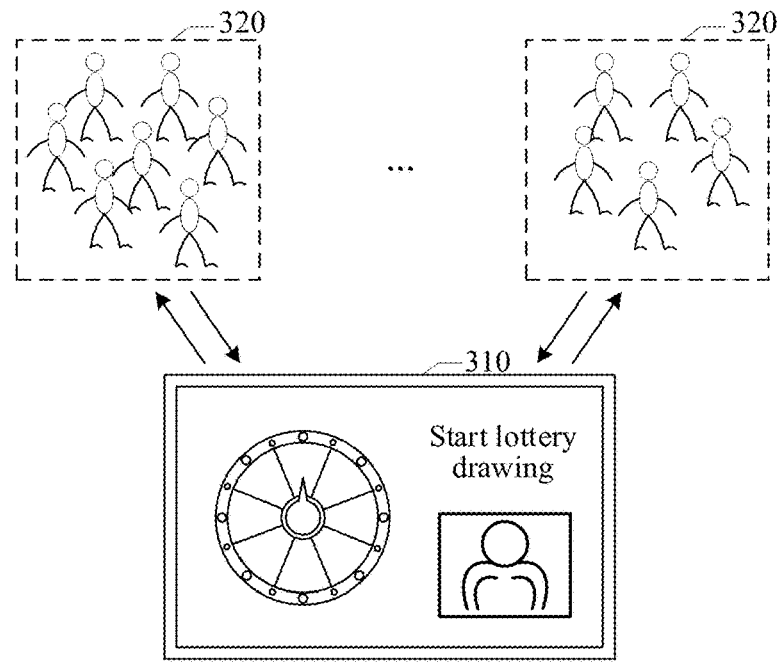
FIG. 3 shows a schematic diagram of an application scene in which a virtual scene and a real scene interact in some embodiments of this disclosure.

FIG. 3 schematically shows a schematic diagram of an application scene in which a virtual scene and a real scene interact in embodiments of this disclosure. As shown in FIG. 3, a virtual scene 310 may be connected to at least one real scene 320 by using network communication, to interact with the at least one real scene 320 simultaneously. The virtual scene 310 shown in the figure is an application scene of virtual lottery drawing. In addition, the virtual scene 310 may also be various application scenes such as a virtual turntable, virtual bubble blowing, virtual car driving, and virtual voting.

In step S220, real scene information of each real scene is obtained in real time.

The real scene information of the real scene may be obtained in real time by using a network communication connection between the virtual scene and the real scene. For example, in the real scene, an information acquisition may be performed on an activity site in real time by using an information acquisition device such as a camera or a microphone, and then the acquired information is transmitted to the server or client in which the virtual scene is located by using the network communication connection. In some implementations, in this step, a real-time communication link of a full-duplex communication protocol (WebSocket) based on a transmission control protocol (TCP) may be established between the virtual scene and the real scene, and the real scene information of the real scene is obtained by using the real-time communication link.

Figure 4:
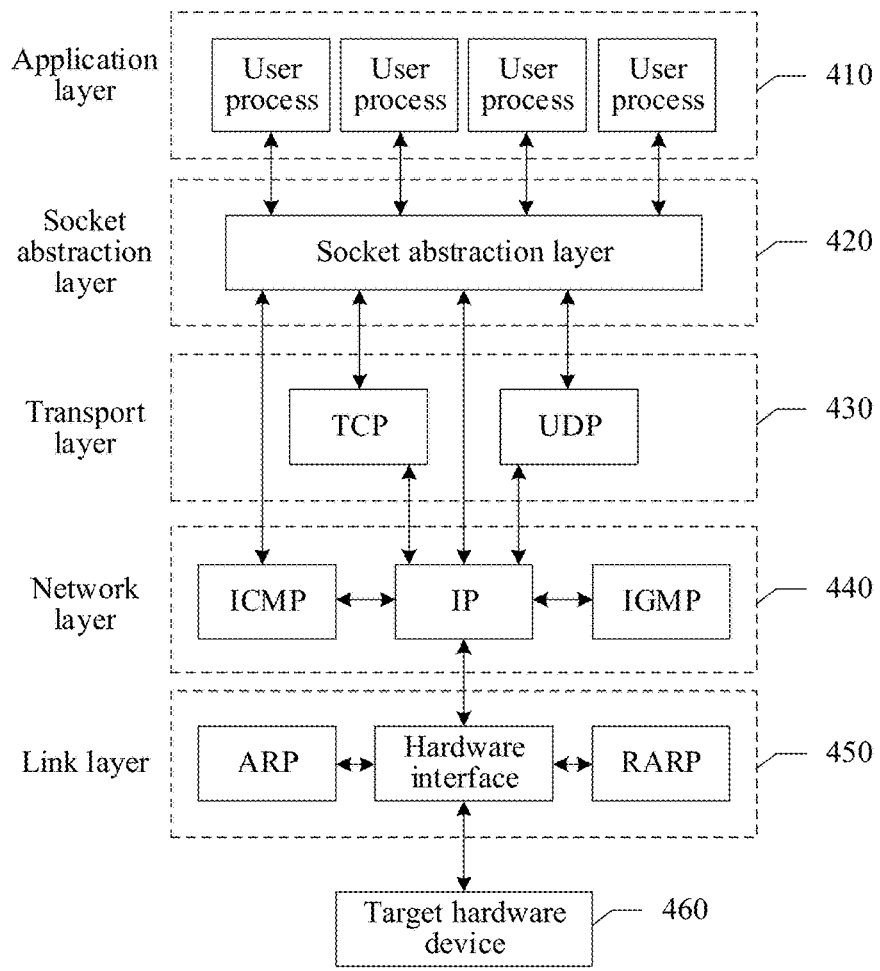
FIG. 4 shows a schematic diagram of a real-time interaction scene communication model established based on a WebSocket according to some embodiments of this disclosure.

FIG. 4 schematically shows a schematic diagram of a real-time interaction scene communication model established based on a WebSocket according to embodiments of this disclosure. The WebSocket protocol is a new network protocol based on the TCP, and belongs to the application layer protocol like a http protocol. The WebSocket protocol implements full-duplex communication between a browser and a server, that is, allows the server to actively transmit information to the client. As shown in FIG. 4, the communication model may include an application layer 410, a Socket abstraction layer 420, a transport layer 430, a network layer 440, and a link layer 450. The application layer 410 includes a plurality of user processes, and is mainly responsible for providing a user interface and a service support. The Socket abstraction layer 420 abstracts a complex operation of a TCP/IP layer into several simple interfaces, for the application layer 410 to invoke to implement communication of the processes in the network. The transport layer 430 includes a connection-oriented TCP protocol and a connectionless UDP protocol, and is mainly responsible for transporting an entire message from a process to another process. The UDP protocol is the user datagram protocol, and may provide a method for transmitting an encapsulated IP datagram without establishing a connection for an application program, and the UDP protocol and the TCP protocol are two main protocols complementing each other in the transport layer 430. The network layer 440 include an ICMP protocol, an IP protocol, and an IGMP protocol, and is mainly responsible for routing and transmission of packet data between hosts, or between a host and a router or a switch. The ICMP protocol is the Internet control message protocol and is mainly used for transmitting control information between a host and a router, including reporting errors, exchanging limited control and status information, and the like. The IP protocol is the Internet Protocol and is mainly responsible for routing and transmission of data, to ensure that a computer may transmit a datagram to and receive a datagram from another computer. The IGMP protocol is the Internet Group Management Protocol, is run between a host and a multicast router, and is used for managing the joining and leaving of multicast group members, and maintaining information of the multicast group members. The link layer 450 includes an ARP protocol, a hardware interface, and a RARP protocol, is mainly responsible for establishing and managing a link between nodes, and is used for changing a physical channel with an error into an error-free data link that can reliably transmit data frames. The ARP protocol is the Address Resolution Protocol and is used for resolving a physical address (MAC address) of a target hardware device 460 by using an IP address of the target hardware device 460, while the RARP protocol is used for converting the physical address into the IP address.

Figure 5:
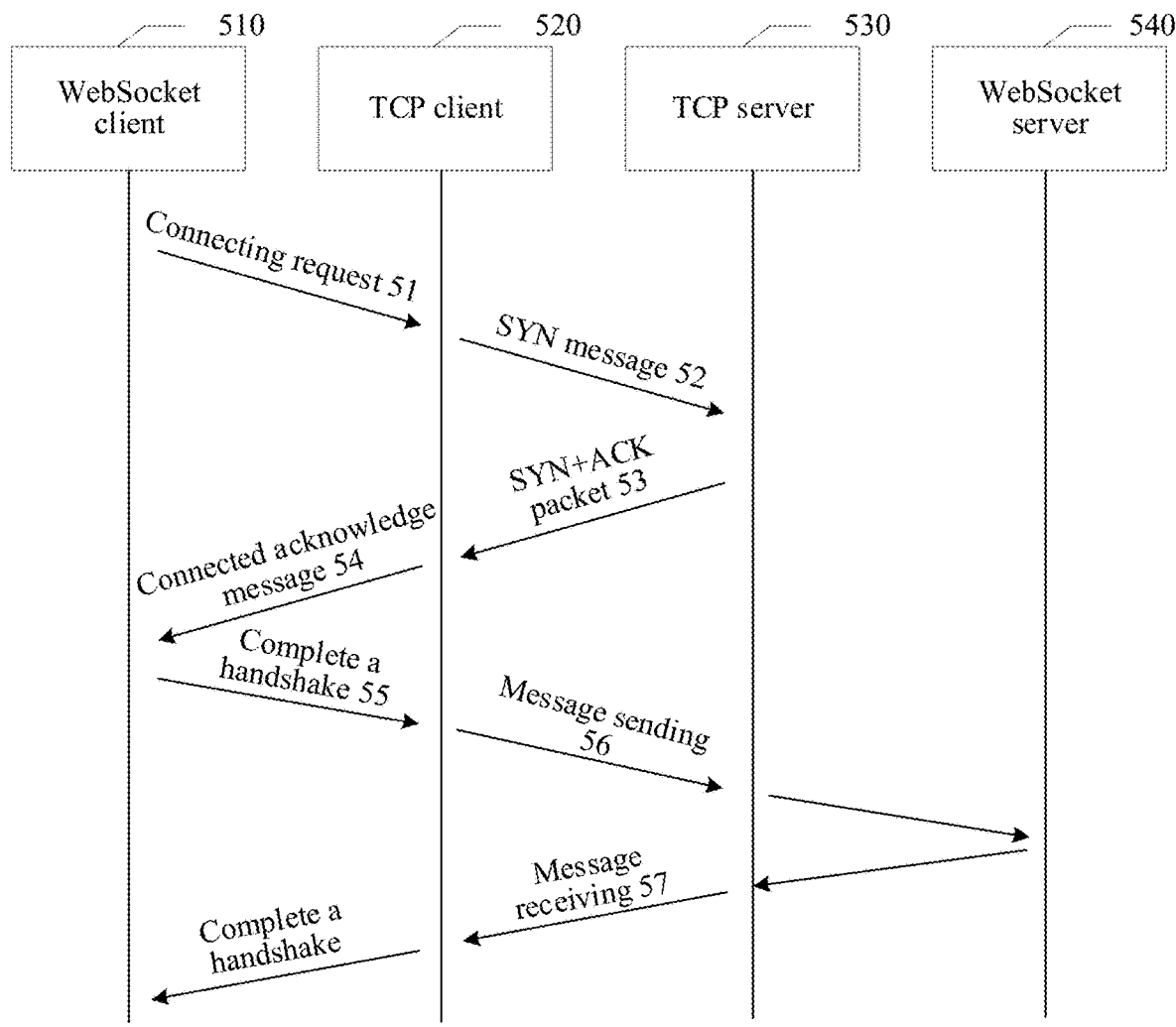
FIG. 5 shows a communication sequence diagram based on a WebSocket protocol according to some embodiments of this disclosure.

FIG. 5 schematically shows a communication sequence diagram based on a WebSocket protocol according to embodiments of this disclosure. As shown in FIG. 5, a WebSocket client 510 first transmits a connecting request 51 (connecting) to a TCP client 520. Based on the connecting request 51, the TCP client 520 transmits a synchronize sequence numbers (SYN) message 52 to a TCP server 530, and the TCP server 530 responds to the TCP client 520 with an SYN+ACK packet 53 formed by using the SYN message and an acknowledge character (ACK). After receiving the SYN+ACK packet 53, the TCP client 520 transmits an ACK packet (which is not shown in the figure) to the TCP server 530, and meanwhile returns a connected acknowledge message 54 (connected) to the WebSocket client 510. After the connection is established, the WebSocket client 510 completes a handshake 55 with the TCP client 520. The TCP server 530 and a WebSocket server 540 communicate and interact with each other by using the TCP client 520 and the TCP server 530 to perform message sending 56 (send) and message receiving 57 (receive).

In step S230, a feature extraction is performed on each real scene information, to correspondingly obtain a scene feature of each real scene.

The scene feature obtained by the feature extraction of this step includes at least one of an image feature or an audio feature. For each real scene information of the real scene obtained in real time in step S220, this step may first obtain image information and audio information in the real scene information, then perform a feature extraction on the image information, to obtain an image feature of the real scene, and perform a feature extraction on the audio information, to obtain an audio feature of the real scene.

For example, when the feature extraction is performed on the image information, a scene recognition may be performed on the image information to obtain a scene image feature of the real scene, a face recognition may be performed on the image information to obtain a character image feature of the real scene, and a character action recognition may be performed on the image information to obtain an action image feature of the real scene. The scene image feature is related to information such as the activity site and activity background of the real scene, for example, the scene image feature can be used for reflecting that a real scene is an indoor scene or an outdoor scene, or a specific shopping mall or an open-air square. The character image feature is related to people participating in the offline activity in the real scene, for example, the character image feature may track an activity participant such as a host, a guest, or a spectator in the real scene based on the face recognition. The action image feature is related to the body action of a character in the activity site, for example, a specific posture or gesture may represent a specified action instruction.

When the feature extraction is performed on the audio information, a speech recognition may be performed on the audio information, to obtain a text audio feature of the real scene, and a waveform detection may be performed on the audio information, to obtain a waveform audio feature of the real scene. The text audio feature is related to speech content such as a conversation between activity participants in the real scene, for example, the text audio feature may be a text character or a specific character code obtained by performing a speech recognition on the relevant speech content. The waveform audio feature is related to content such as background music, a sound effect, and the on-site activity atmosphere in the real scene, for example, the waveform audio feature may reflect a noisy state or a quiet state of the real scene.

In step S240, the scene feature of the at least one real scene is mapped to the virtual scene according to a correspondence between the virtual scene and the real scene.

Various scene features extracted by step S230 may be mapped to the virtual scene by using a specific feature mapping manner according to the correspondence between the virtual scene and the real scene, for example, the image feature may be mapped to be a corresponding virtual image such as a virtual background or a virtual character in the virtual scene, and the audio feature may be mapped to be content such as background music, a sound effect, or a speech instruction in the virtual scene, thereby implementing an interaction between the real scene and the virtual scene in scene content.

In the scene interaction method provided by the embodiments of this disclosure, by performing a recognition on information such as the image and the audio of the real scene, and converting the communication to the online server for displaying on a terminal screen, the offline character and scene are combined with the online virtual scene for a real-time integration and interaction, which not only improves interaction efficiency, but also achieves a wider variety of interaction effects.

In some embodiments, the fun and interactivity of the activity may be enhanced through the integration of the offline recognition conduction and online virtual scenes, and the combination of a video technology, a speech technology, and an entity remote sensing technology. Therefore, all activity participants in different regions may be integrated into a virtual scene for a remote interaction, which enhances the influence of the activity on the brand marketing, improves the activity participation of users, and the fun and controllability of the activity, enhances the value of the activity, and has an extremely wide application prospect.

Figure 6:
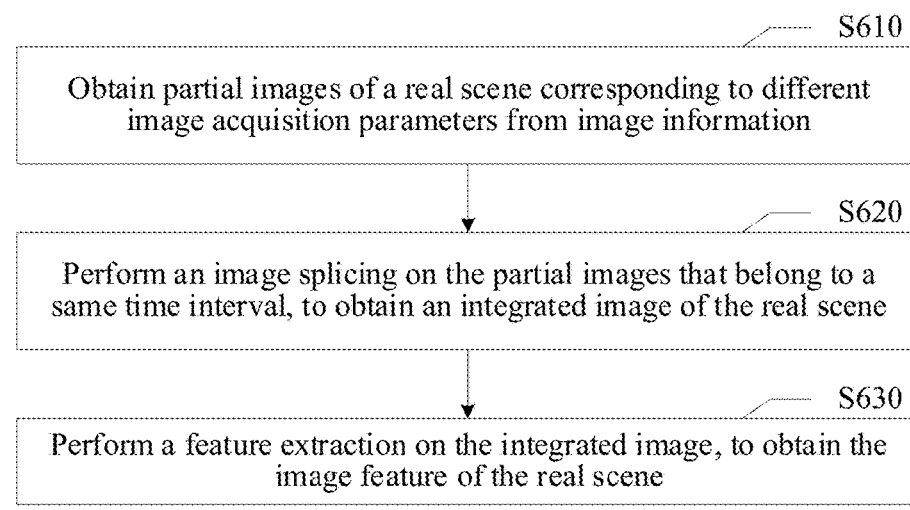
FIG. 6 shows a flowchart of steps of performing a feature extraction on image information according to some embodiments of this disclosure.

Based on the feature extraction on the real scene information, the scene core characteristic of the real scene may be displayed in the virtual scene and an interaction may be implemented. The image information obtained from the real scene information may generally be a dynamic video image acquired by an image acquisition device such as a camera, and an image acquisition may be performed on a same real scene at different positions by a plurality of cameras. On this basis, to improve the processing efficiency of the image feature extraction, dynamic video images may be spliced and converted in advance to form a static image. FIG. 6 schematically shows a flowchart of steps of performing a feature extraction on image information according to some embodiments of this disclosure. As shown in FIG. 6, based on the foregoing embodiments, the performing the feature extraction on the image information may include the following steps:

In step S610, partial images (e.g., regional images) of the real scene corresponding to different image acquisition parameters is obtained from the image information.

The image acquisition parameters may include at least one of an image acquisition angle or an image acquisition range. For example, a plurality of cameras having different image acquisition angles and image acquisition ranges may be deployed in a same real scene to photograph simultaneously, and a video image acquired by each camera is a partial image of the real scene.

In step S620, an image splicing is performed to determine the partial images that belong to a same time interval, to obtain an integrated image of the real scene.

The continuous acquired partial images of the real scene may be divided according to a preset time length, to obtain partial images corresponding to different time intervals. Then, the partial images of the real scene that correspond to different image acquisition parameters and that belong to a same time interval are spliced to obtain an integrated image of the real scene.

In step S630, a feature extraction is performed on the integrated image, to obtain an image feature of the real scene.

After the image splicing, static integrated images corresponding to different time intervals may be obtained. The feature extraction may be performed on each integrated image to obtain a corresponding image feature of the real scene. In some implementations, this step may first perform an edge detection on the integrated image, to obtain a feature region in the integrated image, and then perform the feature extraction on the feature region, to obtain the image feature of the real scene. By performing the edge detection, the range of the feature extraction may be narrowed and the speed and accuracy of the feature extraction may be improved.

Figure 7:
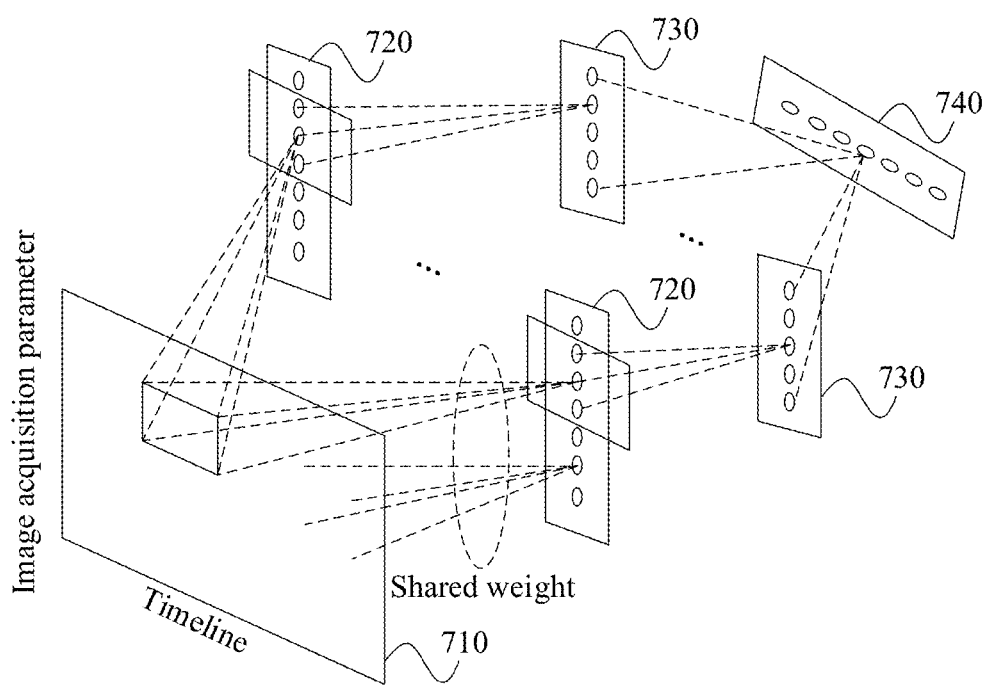
FIG. 7 shows a schematic principle diagram of extracting an image feature by using a CNN model according to some embodiments of this disclosure.

The feature extraction may be performed on the image information of the real scene information by using a pre-trained machine learning model, for example, a convolutional neural network (CNN) may be used for performing convolution and pooling on an input image, to finally output the image feature. FIG. 7 schematically shows a schematic principle diagram of extracting an image feature by using a CNN model according to embodiments of this disclosure. As shown in FIG. 7, the input image of the CNN model is an integrated image 710 in a time interval after the image splicing. A plurality groups of partial images of the real scene corresponding to a same time interval and different image acquisition parameters are arranged in a chronological order along a horizontal direction, and are arranged according to different image acquisition parameters along a vertical direction. Dynamically changing images are spliced into a static integrated image 710. The CNN model includes at least one or more convolution layers 720, and additionally may also include one or more pooling layers 730 and one or more other network structures 740 (for, example, in some embodiments, the other network structure 740 may be a fully connected layer). After the plurality of network layers perform the feature extraction and the feature mapping layer by layer, an image feature corresponding to the integrated image 710 is finally outputted.

Figure 8:
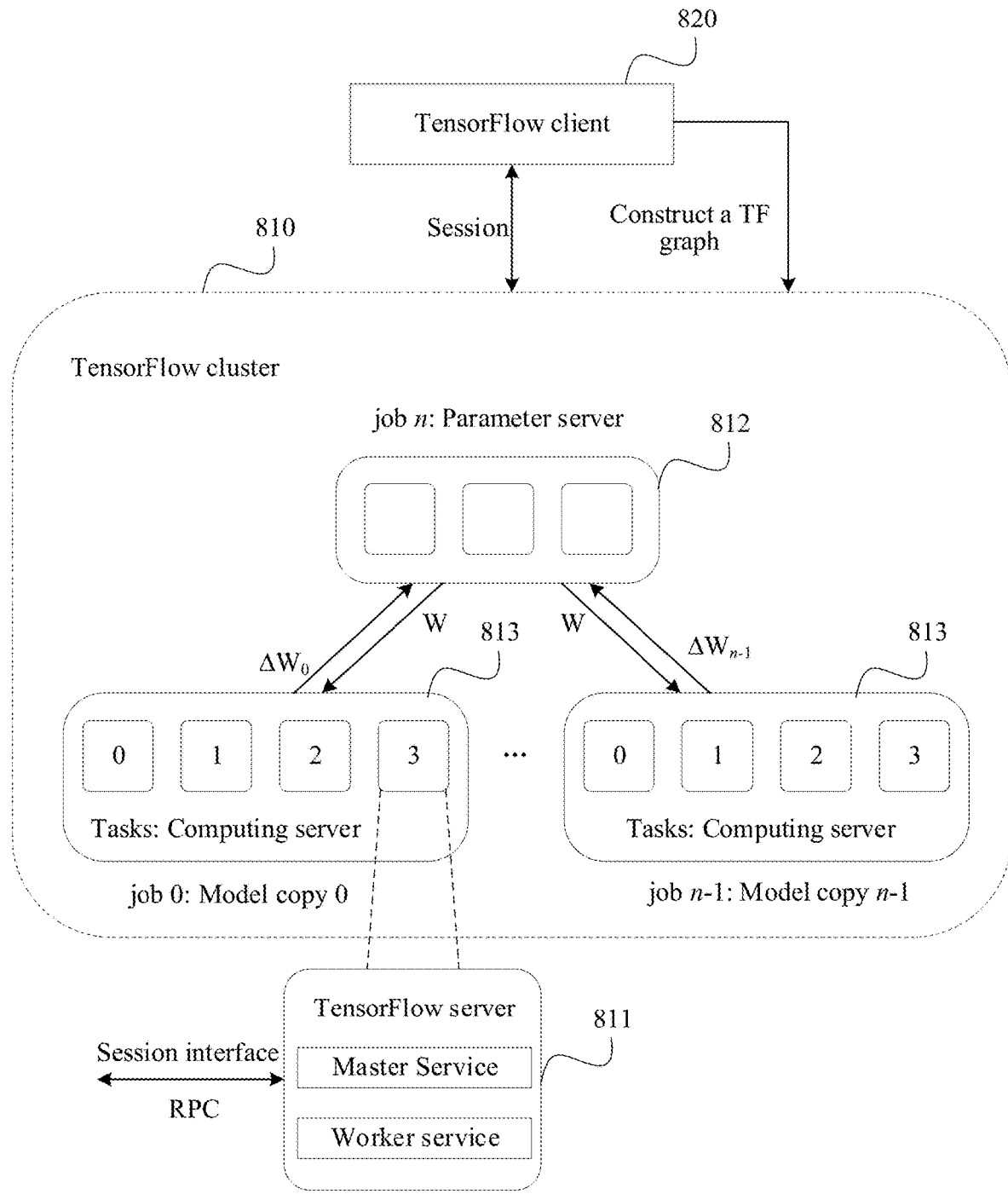
FIG. 8 shows a schematic system layout diagram of a TensorFlow in some embodiments of this disclosure.

The embodiments of this disclosure may use a TensorFlow to train a neural network. FIG. 8 schematically shows a schematic system layout diagram of a TensorFlow in embodiments of this disclosure.

As shown in FIG. 8, a TensorFlow cluster 810 (TF Cluster) includes a plurality of TensorFlow servers 811 (TF Server), these TF Servers 811 are divided into a series of batch processing task jobs, and a task job is responsible for processing a series of tasks. A TF Cluster 810 generally focuses on a relatively high-level target, for example, a neural network is trained in parallel by using a plurality of machines.

A job includes a series of tasks dedicated to a certain same target. For example, a job n corresponding to a parameter server 812 is used for processing work related to storing and updating a network parameter. Job 0, . . . , and job n−1 corresponding to computing servers 813 (workers) are used for bearing those intensive stateless nodes that are used for computation. Generally, tasks in a job are run on different machines.

A task is generally associated with the processing process of a certain single TensorFlow server, belongs to a specific job, and has a unique index in a task list of the job.

The TensorFlow server is used for running the processing process of grpc_tensorflow_server, is a member of a cluster, and exposes a master service and a worker service to the outside.

The master service is a remote procedure call (RPC) service, used for interacting with a series of remote distributed devices. The master service implements a session interface used for performing a session, namely, tensorflow::Session interface, and is used for coordinating a plurality of worker services.

The worker service is an RPC service that performs partial content of a TensorFlow graph (TF graph).

A TensorFlow client 820 generally constructs a TF graph, and uses the tensorflow::Session interface to complete an interaction with the TensorFlow cluster. The TensorFlow client is generally written by using Python or C++. Generally, a TensorFlow client may interact with a plurality of TensorFlow servers simultaneously, and a TensorFlow server may also serve a plurality of TensorFlow clients simultaneously.

After the neural network is constructed based on the TensorFlow, sample data may be used for training the neural network. For the real scene corresponding to the offline activity, a large quantity of offline activity scene videos may be recorded and entered in a simulation manner.

By using a tf.nn.conv2d algorithm in the TensorFlow, a large quantity of videos and picture images may be invoked for training. An image edge recognition may be performed by using an OPEN CV. A recognized block has certain shape data, and through the shape data and a training image data statistics preparation, features of the block may be recognized by comparison. The continuous update and optimization of a network parameter in the neural network may be implemented by using the sample data for iterative training. For example, an algorithm formula a*0.5+b is involved in a certain network layer, and the iterative update process for the formula is as follows:

$$5.4*5.0+1.88=28.88$$

$$9.35805*5.0+2.67161=49.4619$$

$$9.4589*5.0+2.69178=49.9863$$

$$9.46147*5.0+2.69229=49.9996$$

$$9.46154*5.0+2.69231=50.0$$

Based on the update process, it can be seen that the value of the parameter a gradually increases from 5.4 to 9.4589, and further increases to 9.46154. The value of the parameter b gradually increases from 1.88 to 2.67161, and further increases to 2.69231.

In some implementations, a classifier based on a support vector machine (SVM) is taken as an example, and the following loss function may be used:

$$L(y)=\max(0,1-ty)$$

where y is a predicted value, between −1 and +1, and t is a target value (−1 or +1). The value of y between −1 and +1 is enough, and |y|>1 is not encouraged, that is, the classifier is not encouraged to be overconfident. There is no reward for a correctly classified sample away from a division line by a distance more than 1.

In addition, in some implementations of this disclosure, a tf.train.GradientDescentOptimizer may be used as an optimizer for implementing a gradient descent algorithm in the Tensorflow. The gradient descent algorithm may be any one of a standard gradient descent (GD), a batch gradient descent (BGD), or a stochastic gradient descent (SGD).

The standard GD is taken as an example. If the network parameter of learning and training is W, and the loss function is J(W), the partial derivative of the loss function with respect to the network parameter, that is, the relevant gradient, is dJ(W), and a learning rate is Therefore, the formula of updating the network parameter by using the gradient descent method is:

$$W_{s+1} = W_s - \eta \Delta J(W_s)$$

The adjustment of the network parameter minimizes the loss function along the decreasing direction of the gradient direction. A basic policy is to search for a fastest downhill path within a limited field of view. Each time a step is taken, a next step is determined with reference to a steepest gradient direction at a current position.

Figure 9:
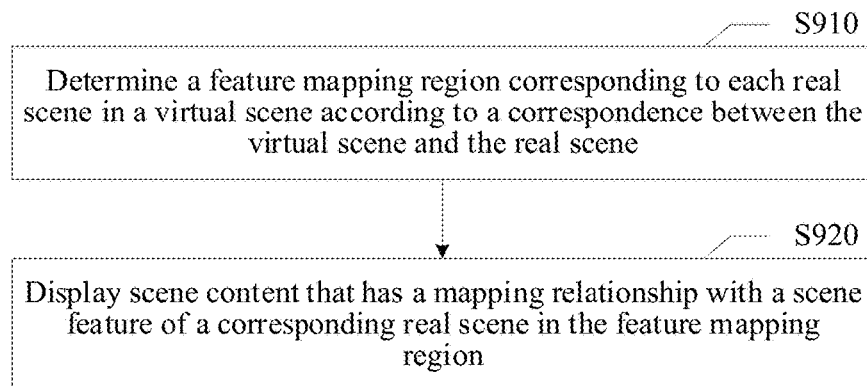
FIG. 9 shows a flowchart of steps of performing a feature mapping on a scene feature in some embodiments of this disclosure.

The neural network obtained based on the training of the TensorFlow may be used for performing the feature extraction on the real scene information of the real scene, and the extracted scene feature is mapped to a corresponding virtual scene. FIG. 9 schematically shows a flowchart of steps of performing a feature mapping on a scene feature in some embodiments of this disclosure. As shown in FIG. 9, based on the foregoing embodiments, in step S240, the mapping the scene feature of the at least one real scene to the virtual scene according to a correspondence between the virtual scene and the real scene may include the following steps:

In step S910, a feature mapping region corresponding to each real scene in the virtual scene is determined according to the correspondence between the virtual scene and the real scene.

In the virtual scene, a part of a specific scene display region may be determined as a feature mapping region corresponding to the real scene. When a virtual scene interacts with a plurality of real scenes simultaneously, each real scene may correspond to a determined feature mapping region in the virtual scene, and these feature mapping regions may be mutually spaced display regions, or may be partially or completely overlapping display regions.

In step S920, scene content that has a mapping relationship with the scene feature of the corresponding real scene is presented in the feature mapping region.

The feature mapping region includes a first feature mapping region and a second feature mapping region. The first feature mapping region and the second feature mapping region may be completely overlapping display regions, may be partially overlapping display regions, or may be completely non-overlapping and mutually spaced display regions.

When the scene feature of the real scene is an image feature, image response content that has a mapping relationship with the image feature may be displayed in the first feature mapping region. When the scene feature is an audio feature, audio response content that has a mapping relationship with the audio feature may be displayed in the second feature mapping region.

In some implementations, when the image response content is displayed based on the image feature, at least one of a scene image feature, a character image feature, or an action image feature may be obtained from the image feature, then a virtual background image that has a mapping relationship with the scene image feature is displayed in the first feature mapping region, a virtual character image that has a mapping relationship with the character image feature is displayed in the first feature mapping region, and action response content that has a mapping relationship with the action image feature is displayed in the first feature mapping region. If image features include more than one of the scene image feature, the character image feature, and the action image feature, the plurality of image features may be displayed at a same first feature mapping region simultaneously, or the plurality of image features may be displayed in different first feature mapping regions respectively. Taking a virtual lottery drawing as an example, when the action image feature obtained by recognition corresponds to the action of turning a turntable of a user, the virtual lottery drawing turntable in the virtual scene may be controlled to start to rotate.

In some implementations, when the audio response content is displayed based on the audio feature, a text audio feature and a waveform audio feature may be obtained from the audio feature, then text response content that has a mapping relationship with the text audio feature is displayed in the second feature mapping region, and an audio dynamic effect that has a mapping relationship with the waveform audio feature is displayed in the second feature mapping region.

Figure 10:
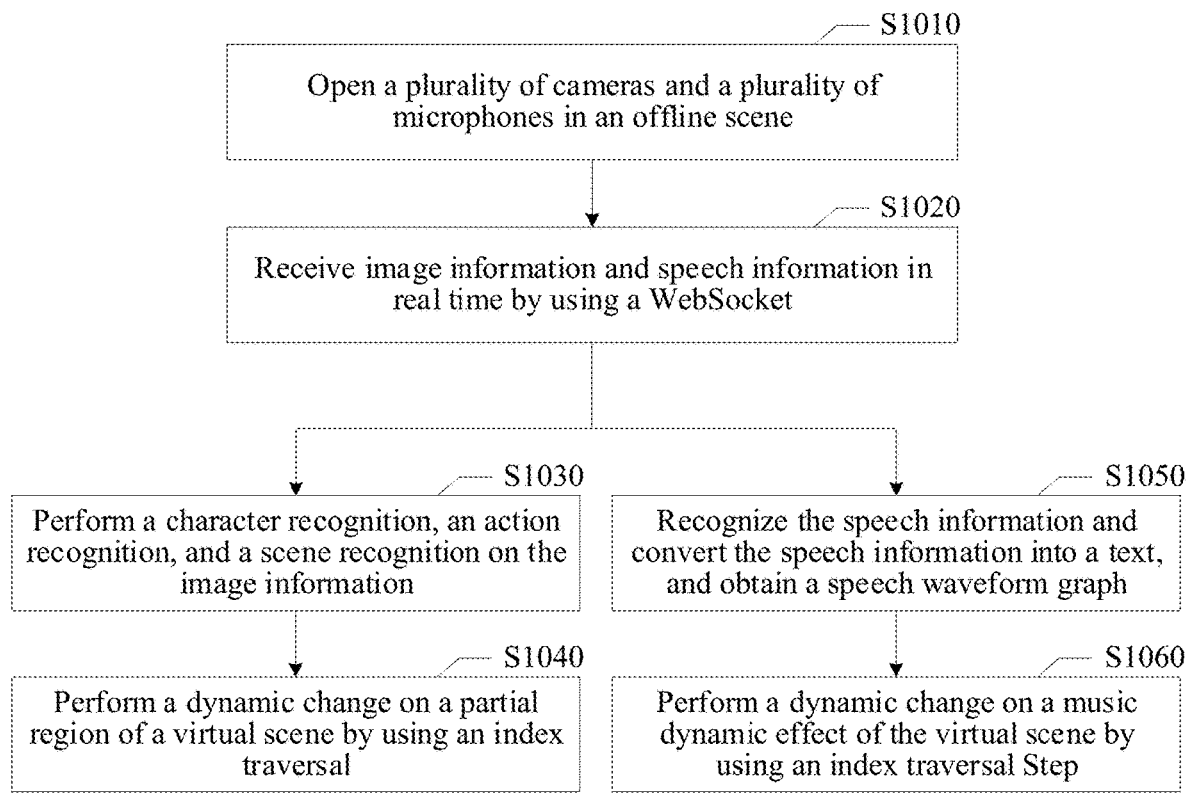
FIG. 10 shows a flowchart of steps in an application scene of a scene interaction method provided by some embodiments of this disclosure.

FIG. 10 schematically shows a flowchart of steps in an application scene of a scene interaction method provided by embodiments of this disclosure. The method may be mainly applied to a server device that dynamically controls the virtual scene. As shown in FIG. 10, the scene interaction method performed in this application scene mainly includes the following steps:

In step S1010, a plurality of cameras and a plurality of microphones are turned on in an offline scene. Three-dimensional space image information related to activity content such as a user action is acquired by using the plurality of cameras, and three-dimensional speech information related to activity content such as a user speech is acquired by using the plurality of microphones.

Figure 11A:
FIG. 11A shows a schematic diagram of a display state of three-dimensional space image information acquired in some embodiments of this disclosure.

FIG. 11A schematically shows a schematic diagram of a display state of three-dimensional space image information acquired in embodiments of this disclosure. As shown in FIG. 11A, the three-dimensional space image information acquired by using the plurality of cameras not only includes a character, but also includes a scene where the character is located, and certainly may further include more detailed information such as character action and expression.

In step S1020, media information, such as the image information and the speech information, is received in real time by using the WebSocket.

In step S1030, image feature extraction, such as a character recognition, an action recognition, and a scene recognition can be performed on the image information.

Figure 11B:
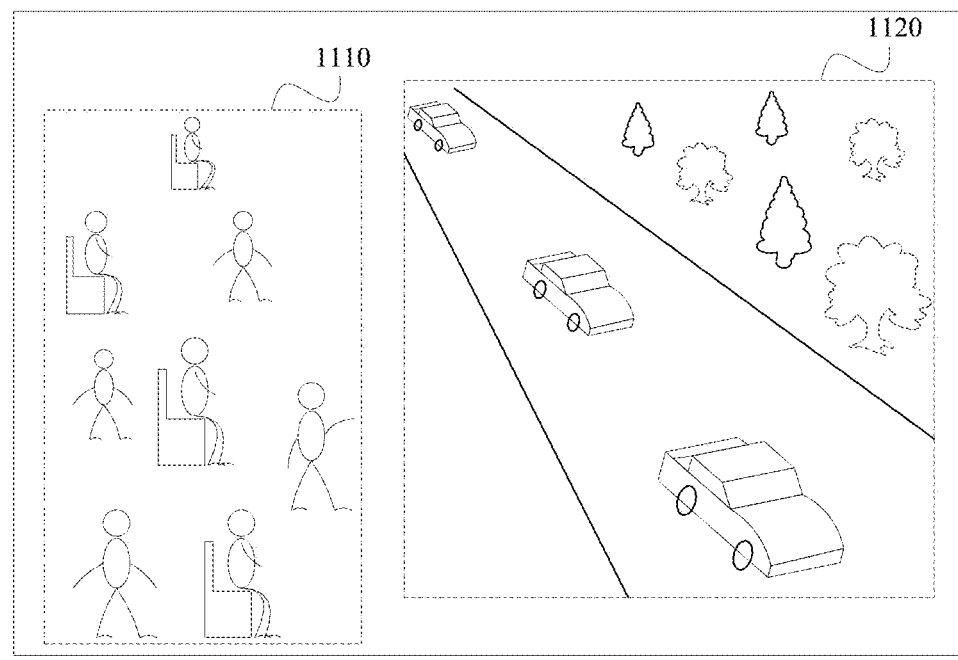
FIG. 11B shows a schematic diagram of a display state of a virtual scene after integrating real scene content in some embodiments of this disclosure.

In step S1040, a dynamic change is performed on a partial region of the virtual scene by using an index traversal. For example, the feature region may be matted according to an image feature obtained in real time. After the feature region is matted, the image feature of the matting of each client is uniformly scheduled to another virtual scene of the activity, and each actual scene character and the action of the character are placed into the virtual scene by calculation, so that the virtual scene fits an actual activity type. FIG. 11B schematically shows a schematic diagram of a display state of a virtual scene after integrating real scene content in embodiments of this disclosure. As shown in FIG. 11B, the actual scene character in the offline activity scene is placed into the virtual scene in the form of a real scene object 1110, and is presented to the user together with a virtual scene object 1120 produced in the virtual scene. The character action and the posture of the real scene object 1110 change with the actual scene character in real time, while the virtual scene object 1120 may be configured and adjusted according to the actual activity type.

Figure 12:
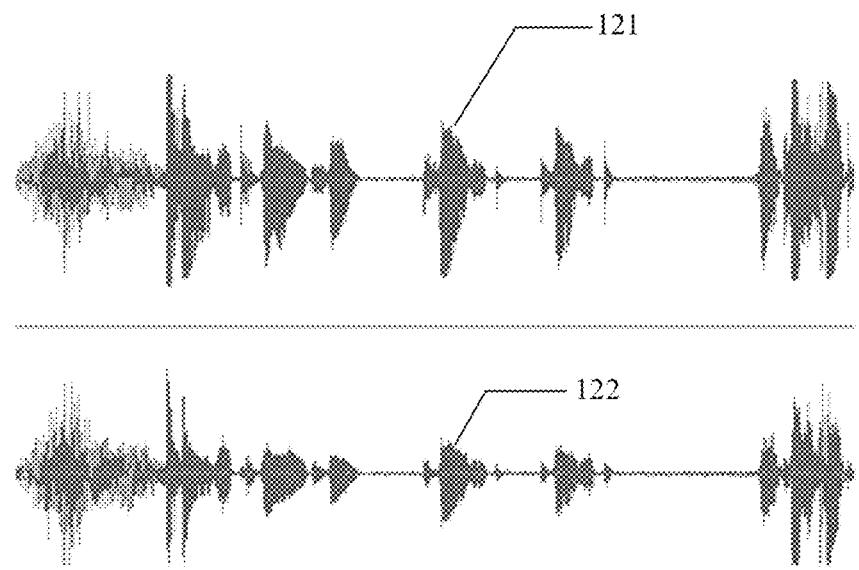
FIG. 12 schematically shows a schematic diagram of a matching relationship between two audio waveforms in some embodiments of this disclosure.

In step S1050: the speech information is recognized and converted into a text, and a speech waveform graph is obtained. The text may be used for forming a speech instruction, for example, "start lottery drawing" or "start voting". The speech waveform graph may be used for matching suitable background music. FIG. 12 schematically shows a schematic diagram of a matching relationship between two waveforms, such as a speech waveform graph and background music in embodiments of this disclosure. As shown in FIG. 12, a similar matching waveform graph 122 may be obtained according to a speech waveform graph 121 obtained by using the speech information, and corresponding background music may be determined based on the matching waveform graph.

In step S1060, a dynamic change is performed on a music dynamic effect of the virtual scene by using an index traversal. The background music of the virtual scene may be matched according to an on-site speech waveform graph, for example, if the offline activity site is relatively quiet, the background music may be changed to relatively soothing background music according to a matching result.

In some implementations, the feature mapping region may be matted according to an image feature obtained in real time. After the feature mapping region is matted, the image feature of the matting of each client is uniformly scheduled to a virtual scene corresponding to the current activity, and each character at the real scene and the action of the character are placed into the virtual scene by calculation, so that the virtual scene fits the type of an actual activity. In addition, the background music of the activity may alternatively be matched according to the speech information acquired in the real scene.

Figure 13:
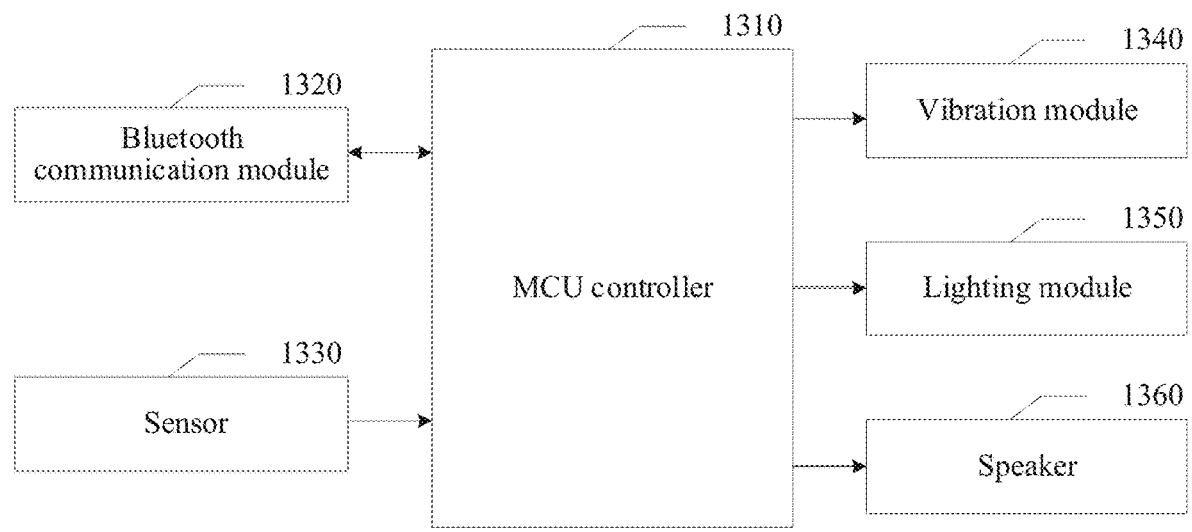
FIG. 13 schematically shows a change controller used for a scene interaction in some embodiments of this disclosure.

In some embodiments, in addition to mapping the scene feature of the real scene to the virtual scene, interaction content may be further fed back to the real scene according to the virtual scene. FIG. 13 schematically shows a change controller used for a scene interaction in embodiments of this disclosure. As shown in FIG. 13, a microcontroller unit (MCU) controller 1310 based on an MCU may use a hardware device in the form of the Internet of Things to interactively control the entity scene of the activity site. Data communication may be performed in the activity site by using a Bluetooth communication module 1320 or another type of short-range communication device. Interactive experience information of the activity site may be detected and acquired by using a sensor 1330. A physical vibration effect may be provided at the activity site by using a vibration module 1340. A lighting visual effect may be provided at the activity site by using a lighting module 1350. A music effect may be provided at the activity site by using a speaker 1360.

In the scene interaction method provided in the embodiments of this disclosure, by performing a physical recognition on an offline scene and character by using a TensorFlow, and converting communication to an online server for displaying on a terminal screen, the offline character and scene are combined with an online virtual scene for integration and interaction, including an application scene such as a virtual lottery drawing, a virtual turntable, virtual bubble blowing, a virtual car driving, and virtual voting, the fun and interactivity of the activity may be enhanced through the integration of the offline recognition conduction and online virtual scenes, and the combination of a video technology, a speech technology, and an entity remote sensing technology. Therefore, all activity participants in different regions may be integrated into a virtual scene for a remote interaction, which enhances the influence of the activity on the brand marketing, improves the activity participation of users, and the fun and controllability of the activity, enhances the value of the activity, and has an extremely wide application prospect.

Although the steps of the method in the embodiments of this disclosure are described in a specific order in the accompanying drawings, this does not require or imply that the steps have to be performed in the specific order, or all the steps shown have to be performed to achieve an expected result. Additionally or alternatively, some steps may be omitted, a plurality of steps are combined into one step, and/or one step is decomposed into a plurality of steps for execution, and the like.

The following describes apparatus embodiments of the embodiments of this disclosure, which can be used to implement the scene interaction method in the foregoing embodiments of this disclosure. For details not disclosed in the apparatus embodiment of this disclosure, reference may be made to the embodiments of the scene interaction method of this disclosure.

Figure 14:
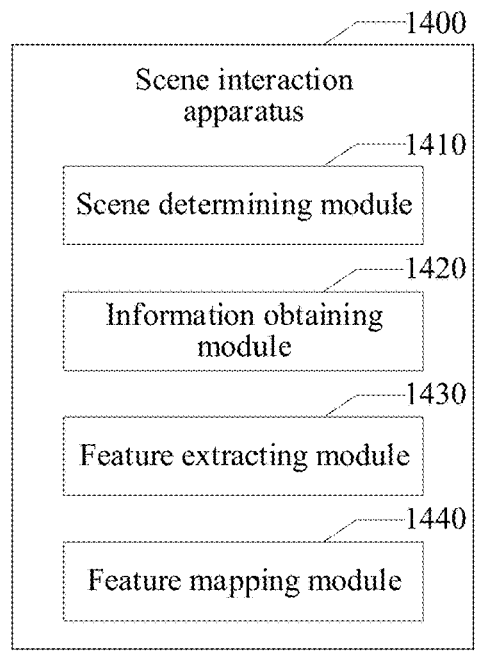
FIG. 14 schematically shows a structural block diagram of a scene interaction apparatus in some embodiments of this disclosure.

FIG. 14 schematically shows a structural block diagram of steps of a scene interaction apparatus in some embodiments of this disclosure. As shown in FIG. 14, a scene interaction apparatus 1400 may mainly include a scene determining module 1410, an information obtaining module 1420, a feature extracting module 1430, and a feature mapping module 1440. The scene determining module 1410 is configured to determine at least one real scene interacting with a virtual scene. The information obtaining module 1420 is configured to obtain real scene information of each real scene in real time. The feature extracting module 1430 is configured to perform a feature extraction on each real scene information, to correspondingly obtain a scene feature of each real scene. The feature mapping module 1440 is configured to map the scene feature of the at least one real scene to the virtual scene according to a correspondence between the virtual scene and the real scene.

It is noted that one or more modules, submodules, and/or units in the present disclosure can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In some embodiments, the scene feature includes at least one of an image feature or an audio feature.

In some embodiments, the feature extracting module 1430 includes: an information extracting unit, configured to obtain image information and audio information in each real scene information; an image feature extracting unit, configured to perform a feature extraction on the image information, to obtain an image feature of the real scene; and an audio feature extracting unit, configured to perform a feature extraction on the audio information, to obtain an audio feature of the real scene.

In some embodiments, the image feature extracting unit includes: a scene recognition subunit, configured to perform a scene recognition on the image information to obtain an scene image feature of the real scene; a face recognition subunit, configured to perform a face recognition on the image information, to obtain a character image feature of the real scene; a character action recognition subunit, configured to perform a character action recognition on the image information, to obtain an action image feature of the real scene; and a first determining subunit, configured to determine the scene image feature, the character image feature, and the action image feature as the image feature of the real scene.

In some embodiments, the image feature extracting unit includes: a partial image obtaining subunit, configured to obtain partial images of the real scene corresponding to different image acquisition parameters from the image information; an image splicing subunit, configured to perform an image splicing on the partial images that belong to a same time interval, to obtain an integrated image of the real scene; and an image feature extracting subunit, configured to perform a feature extraction on the integrated image, to obtain the image feature of the real scene.

In some embodiments, the image acquisition parameters include at least one of an image acquisition angle or an image acquisition range.

In some embodiments, the image feature extracting subunit includes: an edge detecting subunit, configured to perform an edge detection on the integrated image, to obtain a feature region in the integrated image; and a feature extracting subunit, configured to perform a feature extraction on the feature region, to obtain the image feature of the real scene.

In some embodiments, the audio feature extracting unit includes: a speech recognition subunit, configured to perform a speech recognition on the audio information, to obtain a text audio feature of the real scene; a waveform detecting subunit, configured to perform a waveform detection on the audio information, to obtain a waveform audio feature of the real scene; and a second determining subunit, configured to determine the text audio feature and the waveform audio feature as the audio feature of the real scene.

In some embodiments, the feature mapping module 1440 includes: a region determining unit, configured to determine a feature mapping region corresponding to each real scene in the virtual scene according to the correspondence between the virtual scene and the real scene; and a content display unit, configured to display scene content that has a mapping relationship with the scene feature of the corresponding real scene in the feature mapping region.

In some embodiments, the feature mapping region includes a first feature mapping region and a second feature mapping region; and the content display unit includes: an image response content display subunit, configured to display, in a case that the scene feature is an image feature, image response content that has a mapping relationship with the image feature in the first feature mapping region; and an audio response content display subunit, configured to display, in a case that the scene feature is an audio feature, audio response content that has a mapping relationship with the audio feature in the second feature mapping region.

In some embodiments, the image response content display subunit includes: an image feature obtaining subunit, configured to obtain at least one of a scene image feature, a character image feature, or an action image feature from the image feature; a virtual background image display subunit, configured to display a virtual background image that has a mapping relationship with the scene image feature in the first feature mapping region; a virtual character image display subunit, configured to display a virtual character image that has a mapping relationship with the character image feature in the first feature mapping region; and an action response content display subunit, configured to display action response content that has a mapping relationship with the action image feature in the first feature mapping region.

In some embodiments, the audio response content display subunit includes: an audio feature obtaining subunit, configured to obtain a text audio feature and a waveform audio feature from the audio feature; a text response content display subunit, configured to display a text response content that has a mapping relationship with the text audio feature in the second feature mapping region; and an audio dynamic effect display subunit, configured to display an audio dynamic effect that has a mapping relationship with the waveform audio feature in the second feature mapping region. In some embodiments, the information obtaining module 1420 includes: a link establishing unit, configured to establish a real-time communication link of a WebSocket based on a TCP that performs real-time communication between the virtual scene and the real scene; and a link communication unit, configured to obtain the real scene information of the real scene by using the real-time communication link.

Details of the scene interaction apparatus provided in the embodiments of this disclosure have been specifically described in the corresponding embodiment method. Therefore, details are not described herein again.

Figure 15:
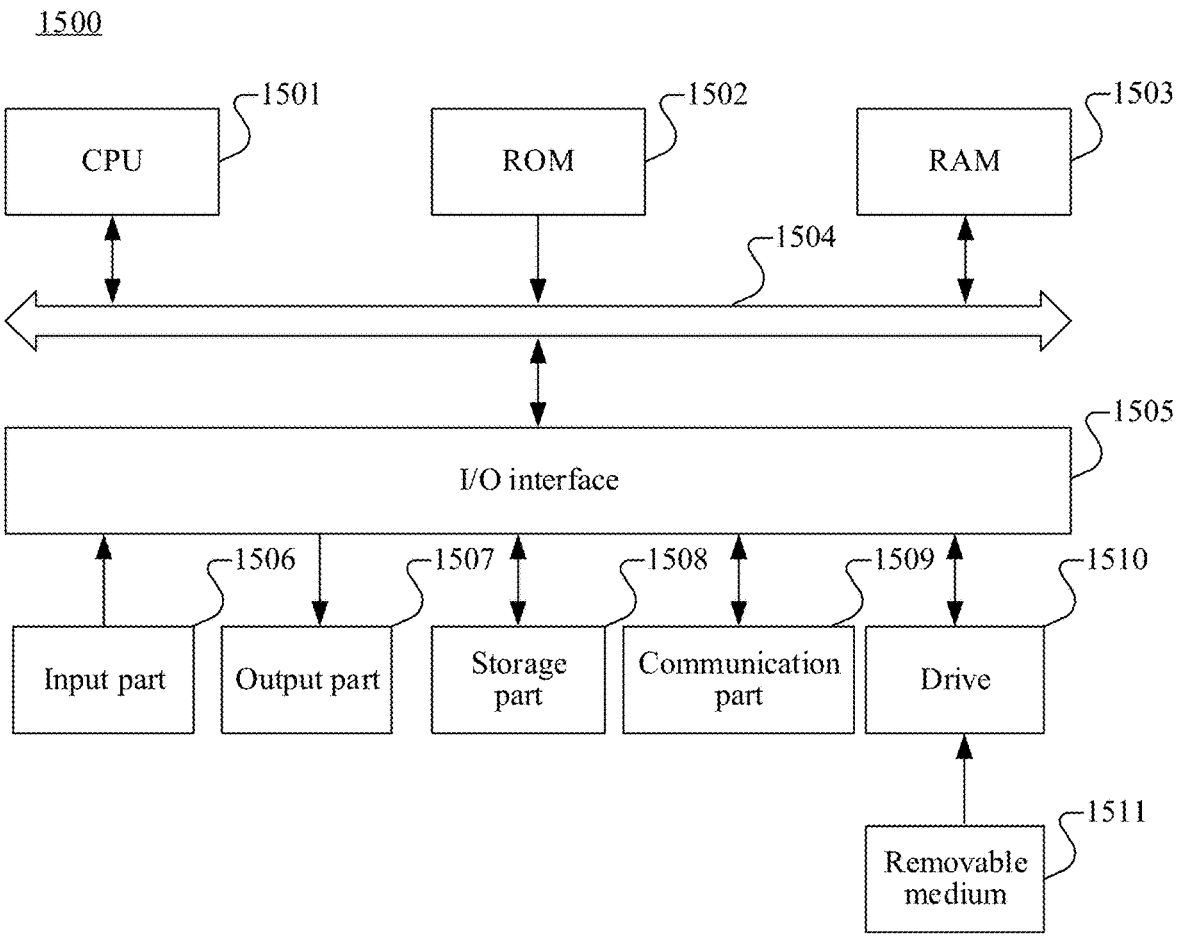
FIG. 15 is a schematic structural diagram of an exemplary computer system adapted to implement an electronic device according to embodiments of this disclosure.

FIG. 15 is a schematic structural diagram of a computer system adapted to implement an electronic device according to embodiments of this disclosure.

A computer system 1500 of the electronic device shown in FIG. 15 is merely an example, and does not constitute any limitation on functions and use ranges of the embodiments of this disclosure.

As shown in FIG. 15, the computer system 1500 includes processing circuitry such as a central processing unit (CPU) 1501, which may perform various proper actions and processing based on a program stored in a read-only memory (ROM) 1502 or a program loaded from a storage part 1508 into a random access memory (RAM) 1503. The RAM 1503 further stores various programs and data required for system operations. The CPU 1501, the ROM 1502, and the RAM 1503 are connected to each other through a bus 1504. An input/output (I/O) interface 1505 is also connected to the bus 1504.

The following components are connected to the I/O interface 1505: an input part 1506 including a keyboard, a mouse, or the like; an output part 1507 including a cathode ray tube (CRT), a liquid crystal display (LCD), a speaker, or the like; a storage part 1508 including a hard disk, or the like; and a communication part 1509 including a network interface card such as a partial area network (LAN) card or a modem. The communication part 1509 performs communication processing by using a network such as the Internet. A drive 1510 is also connected to the I/O interface 1505 as required. A removable medium 1511, such as a magnetic disk, an optical disc, a magneto-optical disk, or a semiconductor memory, is mounted on the drive 1510 as required, so that a computer program read from the removable medium is installed into the storage part 1508 as required.

Particularly, according to the embodiments of this disclosure, the processes described in various method flowcharts may be implemented as computer software programs. For example, the embodiments of this disclosure include a computer program product, the computer program product includes a computer program carried on a computer-readable medium, and the computer program includes a program code used for performing the methods shown in the flowcharts. In such an embodiment, by using the communication part 1509, the computer program may be downloaded and installed from a network, and/or installed from the removable medium 1511. When the computer program is executed by the CPU 1501, the various functions defined in the system of this disclosure are executed.

The computer-readable medium shown in the embodiments of this disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. The computer-readable storage medium may include, but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disc read-only memory (CD-ROM), an optical storage device, a magnetic storage device, or any appropriate combination thereof. In the embodiments of this disclosure, the computer-readable storage medium may be any tangible medium (e.g., a non-transitory computer-readable storage medium) including or storing a program, and the program may be used by or in combination with an instruction execution system, apparatus, or device. In the embodiments of this disclosure, a computer-readable signal medium may include a data signal being in a baseband or propagated as a part of a carrier wave, the data signal carrying computer-readable program code. The propagated data signal may be in a plurality of forms, including but not limited to, an electromagnetic signal, an optical signal, or any appropriate combination thereof. The computer-readable signal medium may be further any computer-readable medium in addition to a computer-readable storage medium. The computer-readable medium may transmit, propagate, or transmit a program that is used by or used in combination with an instruction execution system, apparatus, or device. The program code included in the computer-readable medium may be transmitted by using any suitable medium, including but not limited to: a wireless medium, a wired medium, or the like, or any suitable combination thereof.

The flowcharts and block diagrams in the accompanying drawings illustrate a possible system architecture, a function, and an operation that may be implemented by a system, a method, and a computer program product according to various embodiments of this disclosure. In this regard, each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, two boxes shown in succession may actually be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Although a plurality of modules or units of a device configured to perform actions are discussed in the foregoing detailed description, such division is not mandatory. Actually, according to the implementations of the embodiments of this disclosure, the features and functions of two or more modules or units described above may be specifically implemented in one module or unit. Conversely, features and functions of one module or unit described above may be further divided into a plurality of modules or units to be specified.

Through the descriptions of the foregoing implementations, a person skilled in the art easily understands that the exemplary implementations described herein may be implemented through software, or may be implemented through software in combination with necessary hardware. Therefore, the technical solutions of the embodiments of this disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a PC, a server, a touch terminal, a network device, or the like) to perform the methods according to the embodiments of this disclosure.

This disclosure includes some variations, uses, or adaptive changes of some embodiments.

This disclosure is not limited to the structures that are described above and that are shown in the accompanying drawings, and modifications and changes may be made.

INDUSTRIAL APPLICABILITY

In the embodiments of this disclosure, when an online activity and an offline activity need to be synchronized, a scene feature of a real scene is obtained by performing a feature extraction on real scene information, and the scene feature of the real scene is mapped to a virtual scene, thereby implementing a real-time integration and interaction of an offline character and scene with an online virtual scene, which not only improves interaction efficiency, but also achieves a wider variety of interaction effects. In addition, this method can increase the participation of an online user in an activity and enhance the value of the activity, which has a great industrial applicability.

What is claimed is:

1. A method for scene interaction, the method comprising:
obtaining media information of a first environment scene, the media information including image information and audio information of the first environment scene;
determining, by processing circuitry of an electronic device, a scene feature associated with the first environment scene based on a feature extraction on the media information, the scene feature including (i) at least one of a scene image feature or a character image feature of the first environment scene and (ii) at least one audio feature extracted from the audio information of the first environment scene;

mapping the scene feature including (i) mapping the at least one of the scene image feature or the character image feature to at least one of a virtual background image or a virtual character image and (ii) mapping the at least one audio feature to at least one of a text content or a dynamic effect of a waveform audio feature; and presenting (i) the at least one of the virtual background image or the virtual character image in a first region of a virtual scene and (ii) the at least one of the text content or the dynamic effect in a second region of the virtual scene, wherein the first region and the second region have a predefined positional relationship in the virtual scene.

2. The method according to claim 1, wherein the scene feature comprises an image feature and the at least one audio feature.

3. The method according to claim 1, wherein the determining the scene feature comprises:

performing an image feature extraction on the image information, to obtain an image feature of the first environment scene; and performing an audio feature extraction on the audio information, to obtain the at least one audio feature of the first environment scene.

4. The method according to claim 3, wherein the performing the image feature extraction on the image information comprises:

performing a scene recognition on the image information, to obtain the scene image feature of the first environment scene;

performing a face recognition on the image information, to obtain the character image feature of the first environment scene; and performing a character action recognition on the image information, to obtain an action image feature of the first environment scene.

5. The method according to claim 3, wherein the performing the image feature extraction on the image information comprises:

obtaining regional images of the first environment scene respectively corresponding to regional image acquisition parameters;

combining the regional images of a same time interval into an integrated image of the first environment scene; and performing a feature extraction on the integrated image, to obtain the image feature of the first environment scene.

6. The method according to claim 5, wherein the regional image acquisition parameters comprise at least one of an image acquisition angle or an image acquisition range.

7. The method according to claim 5, wherein the performing the feature extraction on the integrated image comprises:

performing an edge detection on the integrated image, to obtain a feature region in the integrated image; and performing a feature extraction on the feature region in the integrated image, to obtain the image feature of the first environment scene.

8. The method according to claim 3, wherein the performing the audio feature extraction on the audio information comprises:

performing a speech recognition on the audio information, to obtain the text content of the first environment scene; and performing a waveform detection on the audio information, to obtain the waveform audio feature of the first environment scene.

9. The method according to claim 1, wherein the mapping the scene feature comprises:

determining, in the virtual scene, a feature mapping region corresponding to the first environment scene, according to the correspondence between the virtual scene and the first environment scene; and presenting first scene content that maps with the scene feature of the first environment scene in the feature mapping region.

10. The method according to claim 1, wherein the obtaining the media information comprises:

establishing a real-time communication link of a full-duplex communication protocol (WebSocket) based on a transmission control protocol (TCP) that performs a real-time communication between the processing circuitry of the electronic device and a media capturing device for the first environment scene; and obtaining the media information of the first environment scene by using the real-time communication link.

11. The method according to claim 1, wherein and the predefined positional relationship defines that the first region and the second region are completely overlapping.

12. The method according to claim 1, wherein the predefined positional relationship defines that the first region and the second region are non-overlapping.

13. An apparatus, comprising:

processing circuitry configured to:

obtain media information of a first environment scene, the media information including image information and audio information of the first environment scene;

determine a scene feature associated with the first environment scene based on a feature extraction on the media information, the scene feature including (i) at least one of a scene image feature or a character image feature of the first environment scene and (ii) at least one audio feature extracted from the audio information of the first environment scene;

map the scene feature including (i) map the at least one of the scene image feature of the character image feature to at least one of a virtual background image or a virtual character image and (ii) map the at least one audio feature to at least one of a text content or a dynamic effect of a waveform audio feature; and present (i) the at least one of the virtual background image or the virtual character image in a first region of a virtual scene and (ii) the at least one of the text content or the dynamic effect in a second region of the virtual scene, wherein the first region and the second region have a predefined positional relationship in the virtual scene.

14. The apparatus according to claim 13, wherein the processing circuitry is configured to:

perform image feature extraction on the image information, and an audio feature extraction on the audio information.

15. The apparatus according to claim 13, wherein the processing circuitry is configured to:

obtain regional images of the first environment scene;

combine the regional images in a same time interval into an integrated image of the first environment scene; and perform a feature extraction on the integrated image, to obtain an image feature of the first environment scene.

16. The apparatus according to claim 15, wherein the processing circuitry is configured to:

perform an edge detection on the integrated image, to obtain a feature region in the integrated image; and perform a feature extraction on the feature region in the integrated image, to obtain the image feature of the first environment scene.

17. The apparatus according to claim 13, wherein the processing circuitry is configured to:
   perform a speech recognition on the audio information of the first environment scene, to obtain the text content of the first environment scene; and
   perform a waveform detection on the audio information, to obtain the waveform audio feature of the first environment scene.

18. The apparatus according to claim 13, wherein the processing circuitry is configured to:
   determine, in the virtual scene, a feature mapping region corresponding to the first environment scene, according to the correspondence between the virtual scene and the first environment scene; and
   present first scene content that maps with the scene feature of the first environment scene in the feature mapping region.

19. A non-transitory computer-readable medium storing instructions which when executed by a computer cause the computer to perform:
   obtaining media information of a first environment scene, the media information including image information and audio information of the first environment scene;
   determining a scene feature associated with the first environment scene based on a feature extraction on the media information, the scene feature including (i) at least one of a scene image feature or a character image feature of the first environment scene and (ii) at least one audio feature extracted from the audio information of the first environment scene;
   mapping the scene feature including (i) mapping the at least one of the scene image feature of the character image feature to at least one of a virtual background image or a virtual character image and (ii) mapping the at least one audio feature to at least one of a text content or a dynamic effect of a waveform audio feature; and
   presenting (i) the at least one of the virtual background image or the virtual character image in a first region of a virtual scene and (ii) the at least one of the text content or the dynamic effect in a second region of the virtual scene, wherein the first region and the second region have a predefined positional relationship in the virtual scene.

\* \* \* \* \*